W. C. MASON.
LOCK NUT
No. 95,704.  Patented Oct. 12, 1869.
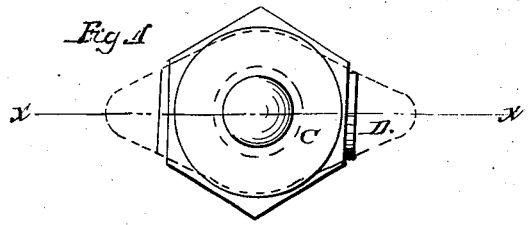
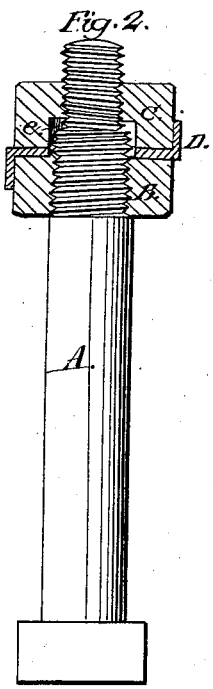

United States Patent Office.

WILLIAM C. MASON, OF BEAVER FALLS, PENNSYLVANIA, ASSIGNOR TO HIMSELF AND J. H. NICHOLS, OF SAME PLACE.

Letters Patent No. 95,704, dated October 12, 1869.

IMPROVEMENT IN LOCK-NUTS.

The Schedule referred to in these Letters Patent and making part of the same.

To all whom it may concern:

Be it known that I, WILLIAM C. MASON, of Beaver Falls, in the county of Beaver, and State of Pennsylvania, have invented a new and useful Improvement in Fastening Bolt-Nuts; and I do hereby declare that the following is a full, clear, and exact description thereof, which will enable others skilled in the art to make and use the same, reference being had to the accompanying drawing, forming part of this specification.

The object of this invention is to provide means for preventing the turning off of screw-nuts from their bolts, and thereby preventing the damage and accidents incident to the use of machinery from that cause; and It consists in the employment of a right and left-handed nut on the bolt, with fastening-washer between, and with a recess in the latter nut to allow of variations in length from the head of the bolt, as will be hereinafter more fully described.

In the accompanying drawing—

Figure 1 represents a top end view of the nuts and washer, the latter being shown with its ends extended, or before being bent on to the nuts.

Figure 2 is a cross-section of the nuts, through the line x–x, but showing the screw-thread entire, and the ends of the washer bent on to the nuts for fastening. The recess in the left-hand or upper nut is also shown in this sectional view.

Similar letters of reference indicate corresponding parts.

A represents the bolt.

B is the lower nut, which, in this example of my invention, is a right-hand screw-nut, put on in the ordinary manner.

C is a left-hand screw-nut, which engages with a left-hand thread on the upper end of the bolt, as seen in the drawing.

This nut has a recess, e, which allows it to be screwed down over the right-hand thread, in case the position of the right-hand nut should require it.

D is a washer placed over the bolt and between the nuts, which, after the nuts have been screwed "home," is turned on to the nuts at each end, as seen in fig. 2. This effectually prevents either nut from turning.

In preventing, by means of the washer, or by any other means, the upper nut C from turning back, the other nut B cannot turn, as any back movement would only serve to bind it the tighter.

Having thus described my invention,

What I claim as new, and desire to secure by Letters Patent, is—

In combination with the right and left-hand nuts C B, and the bolt A, the washer D, substantially as described, for the purpose specified.

WILLIAM C. MASON.

Witnesses:
C. W. TAYLER,
E. M. CHAPMAN.